(12) United States Patent
Roth et al.

(10) Patent No.: US 9,207,001 B1
(45) Date of Patent: Dec. 8, 2015

(54) RETROFIT DEVICE TO IMPROVE VAPOR COMPRESSION COOLING SYSTEM PERFORMANCE BY DYNAMIC BLOWER SPEED MODULATION

(75) Inventors: Robert Paul Roth, Melbourne, FL (US); David C. Hahn, Rockledge, FL (US); Robert P. Scaringe, Melbourne, FL (US)

(73) Assignee: MAINSTREAM ENGINEERING CORPORATION, Rockledge, FL (US)

( * ) Notice: Subject to any disclaimer, the term of this patent is extended or adjusted under 35 U.S.C. 154(b) by 729 days.

(21) Appl. No.: 13/538,441

(22) Filed: Jun. 29, 2012

(51) Int. Cl.
| | |
|---|---|
| *F25D 17/04* | (2006.01) |
| *F25B 41/04* | (2006.01) |
| *F25B 1/00* | (2006.01) |
| *F25B 49/00* | (2006.01) |

(52) U.S. Cl.
CPC ........................................ *F25B 1/00* (2013.01)

(58) Field of Classification Search
CPC ................................................ F25B 2600/112
USPC .......................................................... 62/186
See application file for complete search history.

(56) References Cited

U.S. PATENT DOCUMENTS

| | | | | |
|---|---|---|---|---|
| 4,193,269 | A | * | 3/1980 | Barry ................................ 62/171 |
| 4,315,413 | A | * | 2/1982 | Baker .............................. 62/180 |
| 4,357,988 | A | * | 11/1982 | Hudson et al. ................. 165/202 |
| 5,303,561 | A | | 4/1994 | Bahel et al. |
| 5,490,394 | A | * | 2/1996 | Marques et al. ................. 62/186 |
| 5,931,011 | A | * | 8/1999 | Shima et al. ..................... 62/182 |
| 6,282,910 | B1 | | 9/2001 | Helt |
| 6,560,980 | B2 | * | 5/2003 | Gustafson et al. ............... 62/186 |
| 7,191,607 | B2 | | 3/2007 | Curtis |
| 7,739,882 | B2 | | 6/2010 | Evans et al. |
| 7,946,123 | B2 | | 5/2011 | Tolbert, Jr. et al. |
| 2008/0168789 | A1 | * | 7/2008 | Jones et al. ...................... 62/291 |
| 2012/0079842 | A1 | * | 4/2012 | Lee ................................ 62/186 |

* cited by examiner

*Primary Examiner* — Allen Flanigan
*Assistant Examiner* — Filip Zec

(57) ABSTRACT

A device and method are provided to improve performance of a vapor compression system using a retrofittable control board to start up the vapor compression system with the evaporator blower initially set to a high speed. A baseline evaporator operating temperature with the evaporator blower operating at the high speed is recorded, and then the device detects if a predetermined acceptable change in evaporator temperature has occurred. The evaporator blower speed is reduced from the initially set high speed as long as there is only a negligible change in the measured evaporator temperature and therefore a negligible difference in the compressor's power consumption so as to obtain a net increase in the Coefficient of Performance.

46 Claims, 6 Drawing Sheets

RETROFIT DEVICE TO IMPROVE VAPOR COMPRESSION COOLING SYSTEM PERFORMANCE BY DYNAMIC BLOWER SPEED MODULATION

GOVERNMENT LICENSE RIGHTS

The U.S. Government has paid-up license in this invention and the right in limited circumstances to require the patent owner to license others on reasonable terms as may be provided for by the terms of Contract No. DE-SC-000-3289 awarded by the U.S. Department of Energy.

CROSS-REFERENCE TO RELATED APPLICATION

This application is related to an application entitled "Retrofit Device And Method To Improve Hunidity Control And Coefficient Of Performance Of Vapor Compression Cooling Systems" filed by Paul R. Roth et al. on Jul. 13, 2012, Ser. No. 13/548,828.

BACKGROUND AND SUMMARY OF THE INVENTION

The present invention relates generally to an elegantly simple, low-cost electronic control to improve the efficiency of air conditioners or heat pumps with fixed speed evaporator blower, when the system is operating in cooling mode. It will also provide a benefit for a heat pump operating in heating mode where the vapor compression system is providing the heating function and the indoor coil is now the condenser rather than the evaporator as it was in cooling mod. A fixed speed indoor air handler blower motor of the air conditioner or heat pump is typically manufactured with multiple speed taps that allow the installer to selected one of several possible speeds for the blower to operate when the unit is installed. Typically, these motors have three speeds, but some motors have five or more possible speeds, and of course, a motor blower could be manufactured with only two speeds. Rather than operate this indoor air handler blower at a single speed, the present invention varies the speed of the motor, thereby varying the airflow with a low cost motor instead of using a far more expensive variable airflow technologies such as an electrically commutated motor, variable speed drive, or complex control and sensor logic.

It is well known in the art that increasing the rotational speed of an evaporator blower of a vapor-compression cooling system (thereby increasing the air flow) reduces the air temperature change for a constant cooling capacity and thereby can increase the operating temperature of the evaporator. An increase in evaporator temperature results in a lower temperature lift, and therefore an increased cooling capacity and/or lower compressor power draw. However, the power consumption of the fan increases as well. Therefore, if the increase in temperature and resulting reduction in compressor power draw does not offset the increase in power draw and heat dissipation by the blower used to increase rotational speed of the blower, the net effect is an increase in power consumption and reduction in the Coefficient of Performance (commonly referred to as COPc).

The COPc is the cooling capacity at a particular operating condition (indoor and outdoor wet and dry bulb temperatures) divided by the power consumption at those conditions. The power consumption is mainly comprised of the blower motor power draw, condenser fan power draw, and compressor power draw. Another common term used is Energy Efficiency Rating (or EER). Like COPc, the EER is a ratio of cooling capacity divided by power. However, for the EER calculation, the cooling capacity is measured in units of BTU/hr, and the power input is measured in watts. Although it is not a common engineering practice to have dissimilar units, this EER metric has found wide acceptance and there is a simple conversion which can be calculated by adjusting for the units mismatch, namely EER=3.4 times the COPc. Finally, there is a seasonally adjusted EER which represents a seasonal average of the EER and is referred to as SEER.

The basic concept that higher evaporator temperature improves cycle efficiency comes from the fundamental Carnot cycle and basic principles of thermodynamics. Higher blower speeds means more air flow across the evaporator coil, improved heat transfer and a higher coil temperature and therefore reduced thermal lift. Reduced thermal lift means lower compressor work and increased capacity. However, we have realized that from a systems perspective, increasing blower speed and airflow (and thus, increasing evaporator saturation temperature) will not always increase system efficiency (COPc) because increased blower speed increases blower power draw. The power input to the blower has a heating effect on supply air, meaning increased blower power draw will have an additional heating effect on the conditioned air (decreasing the numerator in the COPc calculation) and increases the system power draw (increasing the denominator in the COPc calculation). For COPc to increase due to increased blower airflow, the additional cooling capacity from the reduced temperature lift must be more significant than the increased heating effect and power draw realized from increasing blower speed. Whether the COPc is increased or decreased due to increased blower speed is a function of operating point (ambient and return air conditions), system design, blower type, ducting, and air filter selection and condition. We have found that by merely using the evaporator saturation temperature, or another variable which parallels that temperature, such as evaporator pressure, evaporator surface temperature, or evaporator air discharge temperature, the evaporator blower motor speed can be altered to reduce overall power consumption and thereby improve COPc, EER, and SEER in a totally unanticipated and surprising manner.

As stated above, the basic concept that higher evaporator temperature improves cycle efficiency comes from the fundamental Carnot cycle and basic principles of thermodynamics. There are numerous references to this well-known fact, such as U.S. Pat. No. 5,303,561 col. 2, lines 13-1, which states that "this is due to the fact that a highly efficient air-conditioning system nominally operates at higher evaporator coil temperature . . . . " That patent proposes the use of a continually variable fan to modulate the fan speed using a "integrated drive and variable speed motor" (col 6, lines 21-22) and this approach in one form or another is used along with complex control logic to establish the optimal fans speed for the desired temperature and humidity in the building using a combination of indoor air temperature, indoor air humidity and outdoor air temperature for selecting the indoor evaporator blower speed.

Likewise, U.S. Pat. No. 6,282,910 discusses using an AC induction blower motor along with a variable speed drive, where alternating current power is directly coupled to the motor at nominal line frequency for full speed operation, or an inverter output is used to alter blower speed when reduced blower speed is desired. Although the existing alternating current (AC) induction motor is used, a continuously variable speed drive inverter is required to vary the motor speed.

Others have proposed modulating the compressor speed (see, e.g., U.S. Pat. No. 7,946,123), but these known approaches also required variable speed drive inverters or different compressors to implement in a retrofit configuration that is both costly and impractical. Likewise, U.S. Pat. No. 7,739,882 discloses a variable speed control system for use with a variable speed compressor.

Significantly, the present invention uses the existing multi-speed selection capability of fixed speed air handler blowers used by most manufacturers (that are not employing the more expensive continuously variable speed blowers). These fixed-speed blowers have several different winding combinations that provide to the HVAC installer the ability to select from an assortment of fixed speeds from the same blower motor (depending on the wiretap that is activated), to best balance the air flow for a particular installation. In a normal application, once the speed is selected for a particular operating mode (cooling, or heating), the air handler blower operates at this speed setting whenever the motor is activated. Typical air handler blower motors have three to five speeds as above noted. Blower speed is typically selected by placing the power-leads on the quick-disconnect post that correlates to the desired blower speed or connecting the power-leads to specific electrical wires originating from the motor and are differentiated by color. Once a speed is selected, the air handler blower will operate at the selected speed whenever it is powered in that mode. While some systems allow for a single fixed speed in cooling mode and a potentially different speed in heating mode, once heating or cooling operation is selected, the indoor coil's blower motor operates at a fixed speed determined by the technician who installed or maintains the system. Instead, the present invention uses at least two of the existing multi-speed blower motor taps to provide dynamic variable speed adjustments during air conditioning operation (cooling mode) based on a single input such as evaporator saturation temperature, evaporator saturation pressure, evaporator outlet air temperature or evaporator surface temperature. One skilled in the art would also understand from this disclosure that for heat pump applications, where the same indoor blower motor is now blowing air across the indoor coil which is functioning as a condenser in the heating mode, the same temperature sensor, or the like, is measuring condenser saturation temperature and can provide dynamic speed variation, this time for the condenser cooling, to improve overall performance in heating mode using the same device, with the only modification being to use the absolute temperature difference of the temperature, as discussed later in this disclosure.

U.S. Pat. No. 7,191,607 discloses a speed control that selectively operates the fixed speed blower motor to slow the speed of the blower for dehumidification but only in the initial stages of the cooling mode, typically the first 5 to 7 minutes. This approach did not, however, recognize that blower speed should be modified to improve system efficiency, and that such blower speed modulation could be easily achieved by actuating different motor windings to produce higher performance with substantially less complexity.

The present invention uses the exact opposite control logic on start-up when compared to the approach in the above-described U.S. Pat. No. 7,191,607. In the present invention, when the air conditioner is started and the evaporator blower is activated, the blower speed is set to maximum speed for the initial startup rather than a slow speed in order to determine the highest possible evaporator operating temperature as the initial baseline, from which the effect of slower evaporator blower (fan) speeds on evaporator temperature can be determined.

Our discovery lowers overall, energy consumption by lowering the air flow (blower fan speed), for those situations when no significant increase in compressor power is observed (as determined by an decrease in evaporator temperature or increase in condenser temperature) due to the lower air flow across the specific heat exchanger coil. A lower blower speed without an increase in compressor power results in a reduction in overall power consumption, and therefore a boost in performance (COP, EER, or SEER). That is, a lower evaporator blower speed does not result in significant decrease in evaporator saturation temperature and/or a lower condenser fan speed (heat pump in heating mode, the condenser fan speed is the indoor blower motor speed) does not result in an increase in condenser saturation temperature. The further benefit of the present invention is simple installation, and the ability to use the existing blower motor, thermostat and overall control system that activates the system. As stated, this novel approach can, of course, also be extended to condenser fan speed, where the condenser fan speed is lowered when no appreciable increase is compressor power occurs (no appreciable increase in condenser temperature) as a result of the lower condenser fan speed, notwithstanding the fact that condenser fans with multiple speed taps are not common in existing air conditioning systems. However, as one well versed in the art would understand, for heat pump systems operating in heating mode, the condenser is the indoor coil (and the evaporator is the outdoor coil), so for a heat pump operating in heating mode, the indoor blower motor is the condenser fan and therefore multiple speed fan motors are possible.

The present invention is elegant in its simplicity and ability to provide significant improvements in performance (COP, EER and SEER) without replacing the existing thermostat based control system, the existing evaporator blower motor, or adding a complex, costly and large inverter or alternative speed controller system. Due to its simplicity, the invention can be easily and quickly retrofitted into exiting air conditioning and heat pump cooling systems in the form of a control board.

More specifically, one embodiment of the invention uses a single electronic control board to boost the system performance. This board is located either inside or outside the air handler, within practical reach to the blower motor (indoor air handler motor). The control board can be powered by 24 VAC from a transformer inside the air handler or the AC voltage (115-240 VAC for example) that powers the blower motor. The two power leads that were originally connected to the blower motor (when in cooling mode) are connected to the control board to indicate when the blower motor should be operating in cooling. Typically, for the cooling mode variable speed control as many as six power leads (corresponding to five speeds and a common) or as few as three power leads (corresponding to a maximum and minimum blower speed and the common), are connected from the control board of the present invention to the different speed setting posts on the air handler blower motor.

In a currently preferred embodiment of the invention, the control board has four connections for two inputs. One input, uses two connections (2 wires) to a device to measure temperature such as a Thermistor, thermocouple, RTD or the like to measure evaporator surface temperature (sensor input). Evaporator saturation pressure, saturation temperature or outlet air could be measured instead of the evaporator surface temperature. The remaining input consists of the two blower power leads that would normally be connected directly to the blower motor (if this invention was not being used) to power the blower motor, when the vapor compression system is operating in cooling mode. The two power leads are a common wire and the switched hot lead for powering the blower when the vapor compression system is operating. These two input power wires are removed from the blower motor and attached to the control board of this invention, and the temperature sensor is attached to the surface of the indoor coil (evaporator in cooling, condenser for heat pump in heating mode). The sensor is preferably located in a region of the evaporator that should contain saturated refrigerant such as in the region of the evaporator directly downstream of the expansion device.

The control board of the present invention has outputs which are connected to three speed taps of the blower motor and the common power connection. The High Speed power lead is connected to the high-speed post of the multi-tap motor, the Medium-Speed power lead is connected to the medium-speed post of the multi-tap motor, and the Low-Speed power lead is connected to the low speed post of the multi-tap blower motor. The common power lead is connected to the common tap of the blower motor. The control board of our preferred embodiment of the invention is powered by scavenging power from the input power leads when they are active, that is when they are sending power to the blower motor. If the blower motor has more than three speeds, then the High-Speed tap is connected to the highest speed tap, the Low-Speed tap is connected to the lowest speed tap and the Medium-Speed tap is connected to one of the speeds nearest the middle speed of that motor. If the motor only has two speeds, then both the Low- and Medium-speed taps are connected to the slower of the two speeds.

Of course, it is well known in the art that the control board can also be powered by the input line power or the 24 VAC available from the transformer inside the air handler. The remainder of the air conditioning or heat pump control system is unchanged.

In our currently preferred embodiment, however, when the thermostat on the air conditioning system calls for cooling, power is supplied to the compressor(s), the condenser fan(s) and the evaporator blower(s). The power is sent to the evaporator blower motor or motors via the aforementioned two power leads which in our invention are now connected to the control board and provide power to the latter. Likewise, in our currently preferred embodiment, however, when the thermostat on a heat pump system is calling for heating or cooling and power is supplied to the compressor(s), the outdoor heat exchanger fan and the indoor coil's blower motor, the power is sent to the indoor blower motor or motors via the aforementioned two power leads which in our invention are now connected to the control board and provide power to the latter.

BRIEF DESCRIPTION OF THE DRAWINGS

These and other features, advantages and objects of the present invention will become more readily apparent from the following detailed description when taken in conjunction with the accompanying drawings wherein.

DETAILED DESCRIPTION OF THE DRAWINGS

Figure 1:
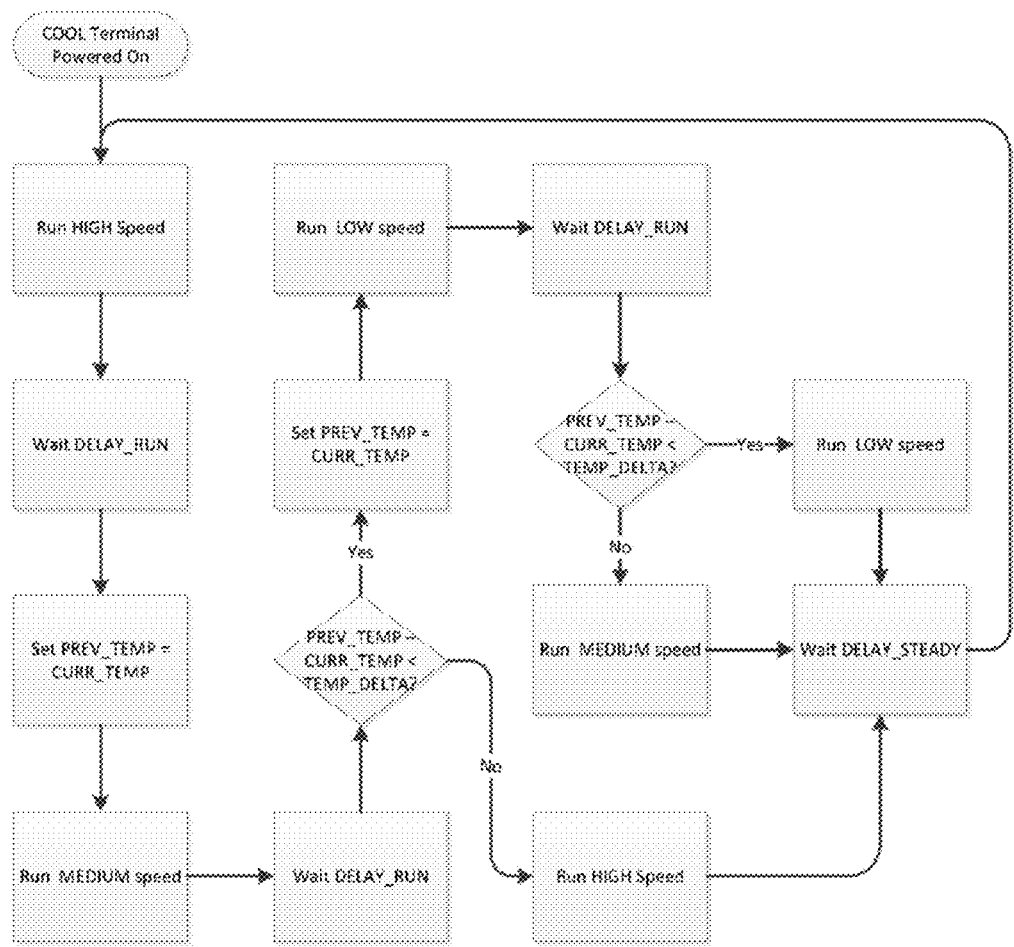
FIG. 1 is a diagram showing the control logic using a three-speed control board for evaporator blower speed control according to one embodiment of the present invention.

Referring to FIG. 1, upon blower start up, via power being supplied to the cooling power lead, (which is sometimes the only power lead being used for a heat pump or air conditioner with electric heat for example), the blower motor initially starts on high speed, by supplying power (COOL Terminal Powered On) to the High-Speed power tap on the evaporator blower motor (indoor air handler). The evaporator blower operates at this speed (Run High Speed) until a predetermined time delay (DELAY_RUN) has occurred (or the unit cycles off). After the time delay (DELAY_RUN), if the unit is still operating, then the evaporator coil surface temperature is recorded (Set PREV_TEMP=CURR_TEMP), and the evaporator blower motor speed is reduced to the medium speed (Run MEDIUM speed), by removing power from the High-Speed tap and instead supplying power to the Medium-Speed tap. The evaporator blower operates at this speed until a predetermined time delay (DELAY_RUN) has occurred (or the unit cycles off). After the time delay (DELAY_RUN), if the unit is still operating, then the evaporator coil surface temperature is recorded (CURR_TEMP). If the newly recorded temperature (CURR_TEMP) is more than or equal to a predetermined amount (TEMP_DELTA) below the earlier stored temperature (PREV_TEMP), that is (PREV_TEMP−CURR_TEMP)≥TEMP_DELTA, then the evaporator blower motor speed is increased back to the high speed (Run in HIGH Speed), by removing power from the Medium-Speed tap and instead supplying power to the High-Speed tap. The unit operates at this high-speed until the unit cycles off. No information is saved when the unit cycles off. When the unit cycles back on, all comparisons are started all over again.

Alternatively, if the newly recorded temperature (CURR_TEMP) obtained at the Medium Speed setting is less than the predetermined amount (TEMP_DELTA), below the earlier stored temperature (PREV_TEMP) which was obtained at the high speed, that is (PREV_TEMP−CURR_TEMP) <TEMP_DELTA then the newly recorded temperature (CURR_TEMP) is saved as the stored temperature (PREV_TEMP=CURR_TEMP) and the evaporator blower motor speed is reduced to the low speed (Run LOW speed) by removing power from the Medium-Speed tap and instead supplying power to the Low-Speed tap. After the time delay (DELAY_RUN), if the unit is still operating, then the evaporator coil surface temperature is again recorded (CURR_TEMP). If the newly recorded temperature (CURR_TEMP) is more than (or equal to) the predetermined amount (TEMP_DELTA) below the earlier stored temperature (PREV_TEMP) which was obtained during medium speed operation, then the evaporator blower motor speed is increased back to the medium speed (Run MEDIUM speed), by removing power from the Low Speed tap and instead supplying power to the Medium-Speed tap. The unit operates at this speed until the unit cycles off. No information is saved when the unit cycles off and when the unit cycles back on, all comparisons are started all over again.

Alternatively if the newly recorded temperature (CURR_TEMP) obtained at low blower motor speed is less than a predetermined amount (TEMP_DELTA) below the earlier stored temperature (PREV_TEMP), which was obtained at the medium evaporator blower motor speed), then the blower motor speed remains at the low blower motor speed (Run LOW speed). The unit operates at this speed until the unit cycles off. No information is saved when the unit cycles off and when the unit cycles back on, all comparisons are started all over again. In addition, a run timer can be used and if the unit should operate longer than DELAY_STEADY without cycling off by the thermostat controlling the unit, then the test can be repeated. The temperature difference (TEMP_DELTA) can be anywhere from 0.0 degree Fahrenheit to 10 degrees Fahrenheit, but our currently preferred embodiment uses a 3-degree difference. The time delay (Wait DELAY_RUN) can be anywhere from 30 seconds to 10 minutes, but our currently preferred embodiment uses a 2-minute delay. The DELAY_STEADY can be anywhere between 6 minutes and 24 hours, but our currently preferred embodiment uses 3 hours. The time delays (DELAY_RUN and DELAY_STEADY) and temperature difference (TEMP_DELTA) can be permanently stored in the board's logic circuitry, requiring only a single number, namely PREV_TEMP which can be temporally stored in memory only during powered operation. With this embodiment, no information needs to be stored when the control board is not being powered from the blower power leads. In the currently preferred embodiment using the logic of FIG. 1, upon blower motor startup, via power being supplied to the separate and distinct heat power lead (for furnace and similar applications that allow for a different blower speed in a non vapor-compression heat mode), the control board provides no active function. This heat power lead can be wired directly to the single preselected fan speed along with passing the common lead to the blower motor.

Figure 2:
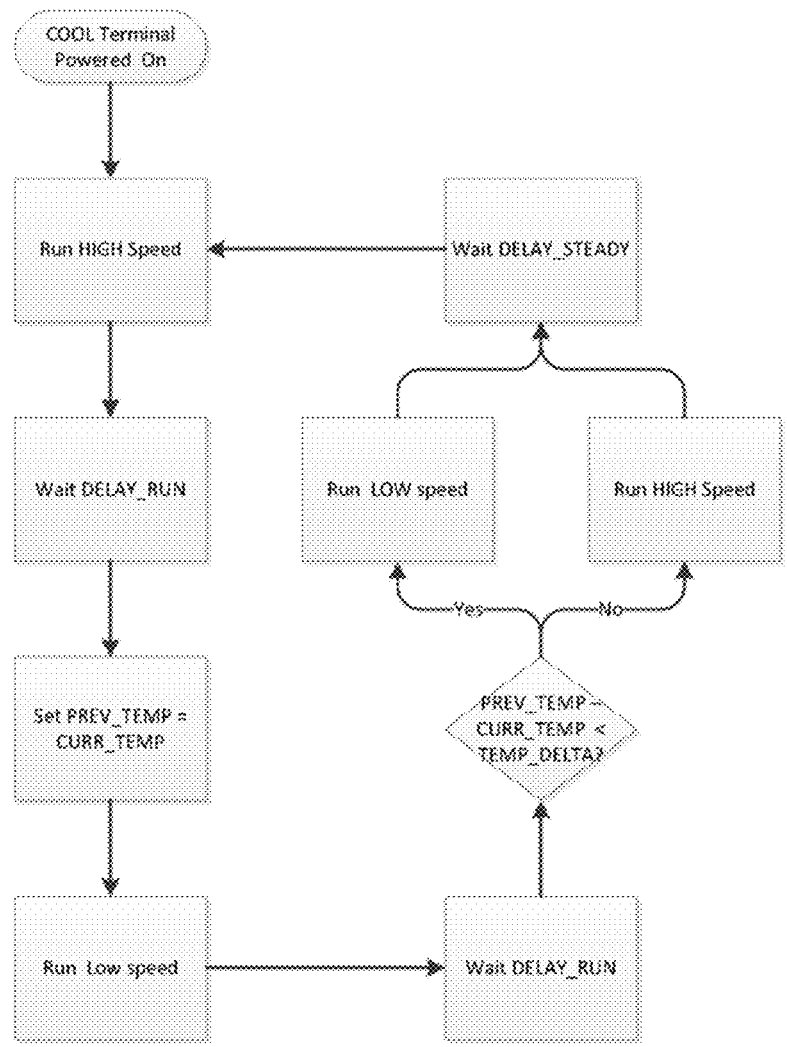
FIG. 2 is a diagram similar to FIG. 1 but showing the control logic using a two-speed control board for evaporator blower speed control according to another embodiment of the present invention.

The inventive concept is, of course, not limited to three blower speed control. Any number of blower speeds greater than two may be used. This same logic can be extended to a control board with more or less than three speed settings by one skilled in the art. For example, the control logic for a two-speed embodiment is shown in FIG. 2 and will be readily understood by one skilled in the art. Referring to FIG. 2, upon blower start up, via power being supplied to the cooling power lead, (which is sometimes the only power lead being used for a heat pump or air conditioner with electric heat for example), the blower motor initially starts on high speed, by supplying power (COOL Terminal Powered On) to the High-Speed power tap on the evaporator blower motor (indoor air handler). The evaporator blower operates at this speed (Run HIGH Speed) until a predetermined time delay (DELAY_RUN) has occurred (or the unit cycles off). After the time delay (DELAY_RUN), if the unit is still operating, then the evaporator coil surface temperature is recorded (Set PREV_TEMP=CURR_TEMP), and the evaporator blower motor speed is reduced to the low speed (Run Low Speed), by removing power from the High-Speed tap and instead supplying power to the Low-Speed tap. The evaporator blower operates at this speed until a predetermined time delay (DELAY_RUN) has occurred (or the unit cycles off). After the time delay (DELAY_RUN), if the unit is still operating, then the evaporator coil surface temperature is recorded (CURR_TEMP). If the newly recorded temperature (CURR_TEMP) is more than or equal to a predetermined amount (TEMP_DELTA) below the earlier stored temperature (PREV_TEMP), that is (PREV_TEMP−CURR_TEMP)≥TEMP_DELTA, then the evaporator blower motor speed is increased back to the high speed (Run HIGH Speed), by removing power from the Low-Speed tap and instead supplying power to the High-Speed tap. The unit operates at this high-speed until the unit cycles off. No information is saved when the unit cycles off. When the unit cycles back on, all comparisons are started all over again. Alternatively, if the newly recorded temperature (CURR_TEMP) obtained at the low speed setting is less than the predetermined amount (TEMP_DELTA), below the earlier stored temperature (PREV_TEMP which was obtained at the high speed, that is (PREV_TEMP−CURR_TEMP)<TEMP_DELTA then the blower motor speed remains at the low blower motor speed (Run LOW speed). The unit operates at this speed until the unit cycles off. No information is saved when the unit cycles off and when the unit cycles back on, all comparisons are started all over again. In addition, a run timer can be used and if the unit should operate longer than a preset time (DELAY_STEADY) without cycling off by the thermostat controlling the unit, then the test can be repeated.

Figure 3:
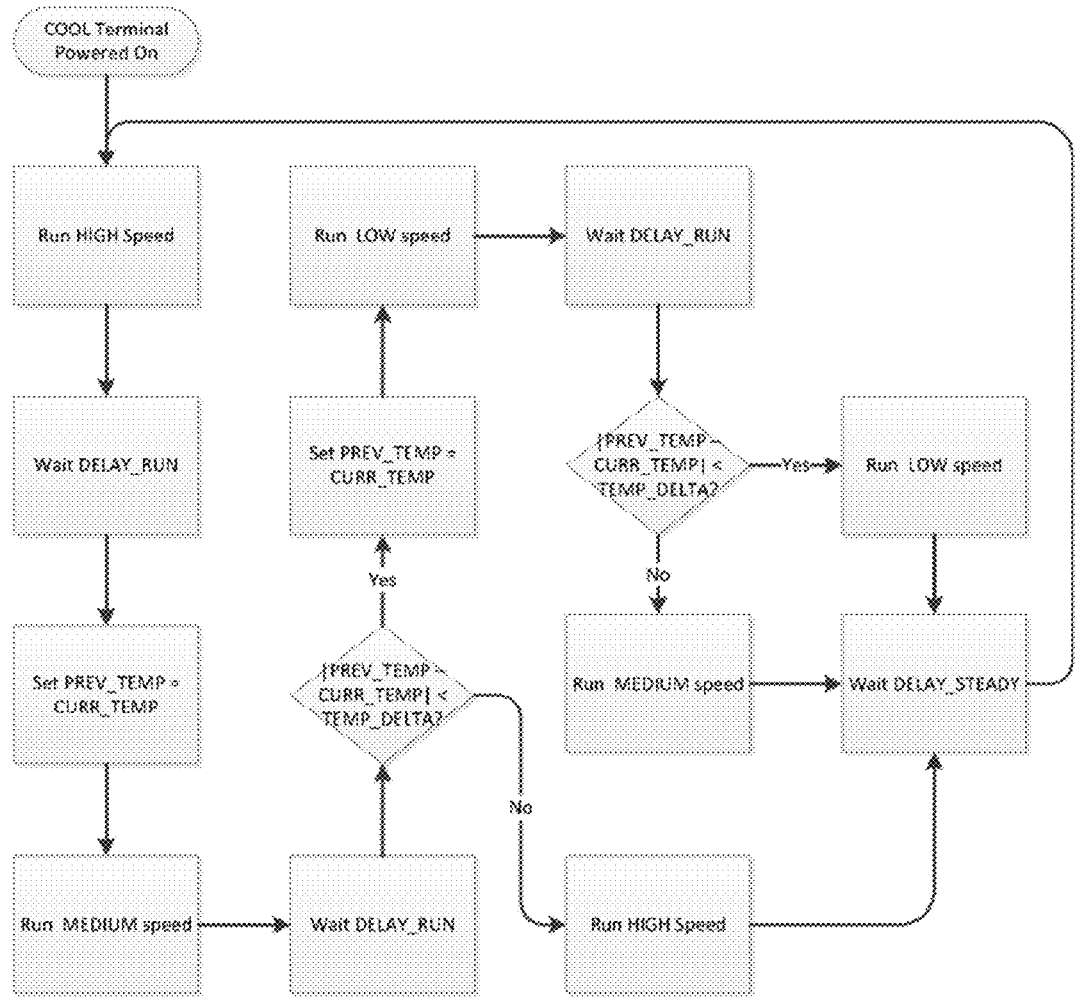
FIG. 3 is a control logic diagram similar to FIG. 1 but showing the present invention usable for an heat pump or air conditioning cooling unit, where the indoor blower motor speed is varied when the indoor unit is an evaporator (cooling mode) or the indoor unit is a condenser (in heating mode) by slightly varying the temperature test performed in the control logic, namely using a absolute value of the temperature comparison.

FIG. 3 shows the preferred embodiment of FIG. 1 adapted for use with either a heat pump or air conditioner, which in the FIG. 3 configuration will vary the speed of the air across the blower motor during heat pump operation (where the indoor coil is the condenser as well as when the indoor coil is the evaporator), with only a slight modification to the control logic of FIG. 1. Referring to FIG. 3, upon indoor coil blower start up, via power being supplied to the cooling power lead, (which is sometimes the only power lead being used for a heat pump or air conditioner with electric heat for example), the indoor coil blower motor initially starts on high speed, by supplying power (COOL Terminal Powered On) to the High-Speed power tap on the indoor coil blower motor (indoor air handler). The blower operates at this speed (Run HIGH Speed) until a predetermined time delay (DELAY_RUN) has occurred (or the unit cycles off). After the time delay (DELAY_RUN), if the unit is still operating, then the indoor coil surface temperature is recorded (Set PREV_TEMP=CURR_TEMP), and the indoor coil blower motor speed is reduced to the medium speed (Run in MEDIUM speed), by removing power from the High-Speed tap and instead supplying power to the Medium-Speed tap. The indoor blower motor operates at this speed until a predetermined time delay (DELAY_RUN) has occurred (or the unit cycles off). After the time delay (DELAY_RUN), if the unit is still operating, then the indoor coil surface temperature is recorded (CURR_TEMP), If the absolute temperature difference between the newly recorded temperature (CURR_TEMP) and the previous temperature (PREV_TEMP) is more than or equal to a predetermined amount (TEMP_DELTA), that is if the absolute value of difference of PREV_TEMP and CURR_TEMP is greater than or equal to TEMP_DELTA, then the indoor coil blower motor speed is increased back to the high speed (Run HIGH Speed), by removing power from the Medium-Speed tap and instead supplying power to the High-Speed tap. The unit operates at this high-speed until the unit cycles off. No information is saved when the unit cycles off. When the unit cycles back on, all comparisons are started all over again.

Alternatively in the FIG. 3 control logic, if the absolute value of the temperature difference is less than the allowable temperature difference (TEMP_DELTA), i.e., Absolute Value of (PREV_TEMP−CURR_TEMP) is less than TEMP_DELTA, then the newly recorded temperature (CURR_TEMP) is saved as the stored temperature (PREV_TEMP=CURR_TEMP) and the blower motor speed is reduced to the low speed (Run on Low Speed) by removing power from the Medium-Speed tap and instead supplying power to the Low-Speed tap. After the time delay (DELAY_RUN), if the unit is still operating, then the evaporator coil surface temperature is again recorded (CURR_TEMP). If the absolute value of the temperature difference between the newly recorded temperature (CURR_TEMP) and the previous temperature (PREV_TEMP) is more than (or equal to) the predetermined amount (TEMP_DELTA), then the blower motor speed is increased back to the medium speed (Run MEDIUM speed), by removing power from the low speed tap and instead supplying power to the Medium-Speed tap. The unit operates at this speed until the unit cycles off. No information is saved when the unit cycles off and when the unit cycles back on, all comparisons are started all over again.

Alternatively if the absolute value of the difference between the newly recorded temperature (CURR_TEMP) and the previous temperature (PREV_TEMP) (obtained at the medium speed) is less than a predetermined amount (TEMP_DELTA), then the blower motor speed remains at the low blower motor speed (Run Low Speed) as shown in FIG. 3. The unit operates at this speed until the unit cycles off. No information is saved when the unit cycles off and when the unit cycles back on, all comparisons are started all over again. Once again, as is FIG. 1, a run timer can be used and if the unit should operate longer than DELAY_STEADY without cycling off by the thermostat controlling the unit, then the test can be repeated. Once again, the temperature difference (TEMP_DELTA) can be anywhere from 0.0 degree Fahrenheit to 10 degrees Fahrenheit, but our currently preferred embodiment uses a 3-degree Fahrenheit difference. The time delay (DELAY_RUN) can be anywhere from 30 seconds to 10 minutes, but our currently preferred embodiment uses a 2-minute delay. The DELAY_STEADY can be anywhere between 6 minutes and 24 hours, but our currently preferred embodiment uses 3 hours. The time delays (DELAY_RUN and DELAY_STEADY) and temperature difference (TEMP_DELTA) can be permanently stored in the board's logic circuitry, requiring only a single number, namely PREV_TEMP which can be temporally stored in memory only during powered operation. With this embodiment, no information needs to be stored when the control board is not being powered from the cooling blower power leads. In the currently preferred embodiment using the logic of FIG. 3, upon blower motor startup, via power being supplied to a separate heat power lead (for furnace and similar applications that allow for a different blower speed in a non vapor-compression heat mode), the control board provides no function.

Our system will work for any vapor compression cooling or refrigeration system where the energy flow to the evaporator or condenser is controlled by a fan or blower motor or a fluid pump, as long as the motor on the fan, blower, or pump has multiple fixed speed taps that can be accessed to enable different motor speeds.

Example 1

As described above, the evaporator saturation temperature at higher blower speeds must rise a minimum amount for the increased net cooling capacity to outweigh the increased blower power consumption that occurs when operating the blower at the higher speed. For experiments performed with a 3-ton split system with an International Comfort Products gas furnace air handler (NTG3075FBA4/FBF075B12A4), the blower motor power consumption savings obtained by reducing the fan speed from high to low was 290 Watts, yet the evaporator temperature decrease was only 1 degree Fahrenheit. For this example, the compressor work at the lower blower speed (slightly lower evaporator temperature) was constant and the refrigeration cooling capacity was reduced by 117 watts. Since the fan was consuming 290 Watts less power, that means 290 Watt of extra energy in the form of heat was not being injected into the cooling air flow, so that the overall system's cooling capacity was increased by 173 Watts (calculated as 290 Watts in reduced heat injected into the air cooling stream minus 117 Watts of reduced refrigerant cooling capacity producing a net gain in cooling capacity of 173 watts.) In addition, the 290 Watt power consumption decrease and 173 Watt cooling capacity increase improved system EER from 10.3 (when normally operating at high blower speed) to 11.9 (when operating at the low blower speed), for an overall improvement in EER of 1.6 (11.9-10.3).

Example 2

For experiments performed with a 3 ton, 14 SEER split system with a Goodman air handler (ARUF374316BA), the blower motor power consumption savings obtained by reducing the fan speed from high to low was 243 Watts, yet the evaporator temperature decrease was only 2.6° F. For this example, the compressor work at the lower blower speed (slightly lower evaporator temperature) was about 20 Watts less; however, the refrigerant cooling capacity was reduced by 527 Watts. Therefore, the net system energy consumption was reduced by 263 Watts (243+20=263), and the net system cooling capacity was decreased by 284 Watts (527-243), i.e., 527 Watts of reduced refrigerant cooling capacity less 243 Watts in reduced blower power consumption (reduced heat into the cooling stream). The decreased power consumption and cooling capacity improved system EER from 13.6 (when normally operating at high blower speed) to 14.7 (when operating at low blower speed)), for an overall improvement in EER of 1.1 (14.7-13.6).

Our novel discovery can also be extended to the outdoor condenser fan during cooling mode if the condenser fan has multiple speed taps, which is not a common occurrence.

While the previous discussion related to air conditioners and heat pumps, the present invention can also be used where a vapor compression heat pump or air conditioner is used with a gas, oil or electric furnace. For furnace applications, the indoor blower typically operates at a speed that is different from the speed when an vapor compression cycle is used, and a separate power terminal to the indoor blower motor is provided (on the equipment control board). This separate power terminal for heating is, commonly referred to (and labeled) as the heat fan speed. Since the present invention operates when power is being supplied to the indoor air handler blower motor via the "cool" power terminal (which is commonly used for air conditioning, and heat pump applications), when power is instead supplied to the separate heat terminal, the fan speed control can easily be handled differently. In one embodiment, when the heat terminal is powered, during furnace operations, a single non-adjustable speed (typically low speed) is routed to the indoor blower motor and no active control of the blower motor speed is used. The control board could also, if desired, be programmed by one of ordinary skill in the art to modulate blower motor speed for heating operation following the principles of this invention.

When the system being retrofitted has separate blower motor power leads for heating and cooling, the invention can be configured so that the installer connects both leads to the control board inputs in specifically marked terminals. As stated earlier, in the currently preferred embodiment, the "heat" mode wire does not activate any components of the control board; rather this input power is passed directly to a single predetermined blower motor speed terminal determined by the installer (typically the low speed terminal) without being routed through the proposed invention. However, one skilled in the art can see that as an alternative, the "heat" power lead can be routed through the control board of the present invention via a normally closed contact of a single-pole double throw relay that passes this power directly to the selected terminal. Alternatively, when power is present on the "cool" mode supply wires, the normally closed contact feeding the heating terminals is opened, the control board microprocessor is powered from the power on the "cool" mode power leads, and the fan modulation routine is performed. This single-pole, double throw relay prevents accidentally powering any additional devices that may have been installed on the heat or cool line. This is but a brief sampling of the various ways available to one skilled in the art as a method to disable the proposed invention when the system is in heating mode, should this be desired.

Figure 4:
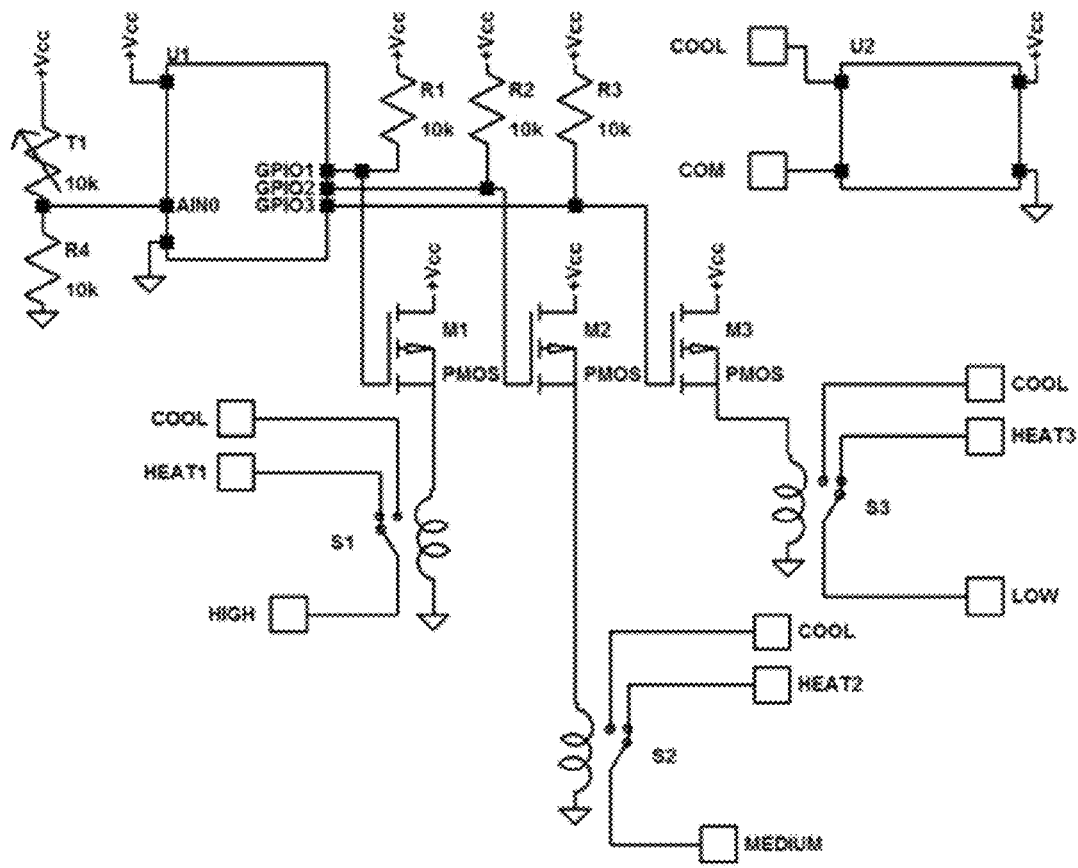
FIG. 4 is a schematic diagram of the currently preferred embodiment of the three-speed control board of the type used for providing the control logic shown in FIG. 1.

FIG. 4 is an electrical schematic of one currently contemplated embodiment of the electronic controller board, including a core microprocessor element U1 (as shown in the preferred embodiment as a Freescale RS08 series microcontroller), a thermistor T1, relays S1, S2, and S3, relay driver circuitry components M1-M3, R1-R3, and a low voltage supply U2. A temperature sensor to be used can be selected from any one of commercially available resistance-based temperature sensors, such as a standard thermistor or resistance temperature detector (RTD), both of which change resistance proportional to the temperature of the element. This is shown in FIG. 4 as thermistor T1 in a voltage divider with resistor R4. A small microprocessor element U1 can be comprised of a simple 8-bit microcontroller that records temperatures in the procedure as described above and uses the relays S1 through S3 to switch the input power to one of the speed legs of the blower motor during cooling operation. Each relay S1, S2, S3, is of SPDT type to account for handling heat-mode power—the preferred embodiment simply routes original power for heating directly to one of the speed terminal of the motor, depending on which heat terminal, HEAT1, HEAT2, HEAT3 is chosen as the connection point for the heat lead. P-channel MOSFETs M1, M2, M3 and resistors R1, R2, R3 interface between microcontroller U1 and relays S1, S2, S3. Supply U2 is a simple, conventional power supply device capable of interfacing between the line voltage on the Cool Mode power line and the logic level voltage needed to run the low voltage electronics.

Of course one skilled in the art can make modifications to the board shown in FIG. 4. For example, one may replace resistor R4 with a Wheatstone bridge-style current loop measurement circuit for improved accuracy, or add an additional resistor and voltage regulator in series with divider resistor R4 to maximize temperature independence at the expense of adding additional parts and raising the cost of the controller. While shown in the preferred embodiment as driving the relays with high-side P channel MOSFETs M1, M2, M3, one may easily invert the driver circuit with low side N channel MOSFETs or some other basic switching element if desired. The microcontroller U1 could be changed to any other particular microcontroller depending on the designer's preference to achieve the same functionality. Likewise, the power supply U2 could be replaced with a wide number of different voltage regulation/conversion modules or circuits for the same functional purpose of providing a logic-level voltage and power output to the controller.

Adding additional speeds is a minor modification for one skilled in the art by simply adding another switching relay and an additional input to the microprocessor and associated driver switch and resistor. If the system being retrofitted has more speed taps than there are microprocessor pins, a larger microprocessor can be used with a greater number of pins.

Figure 5:
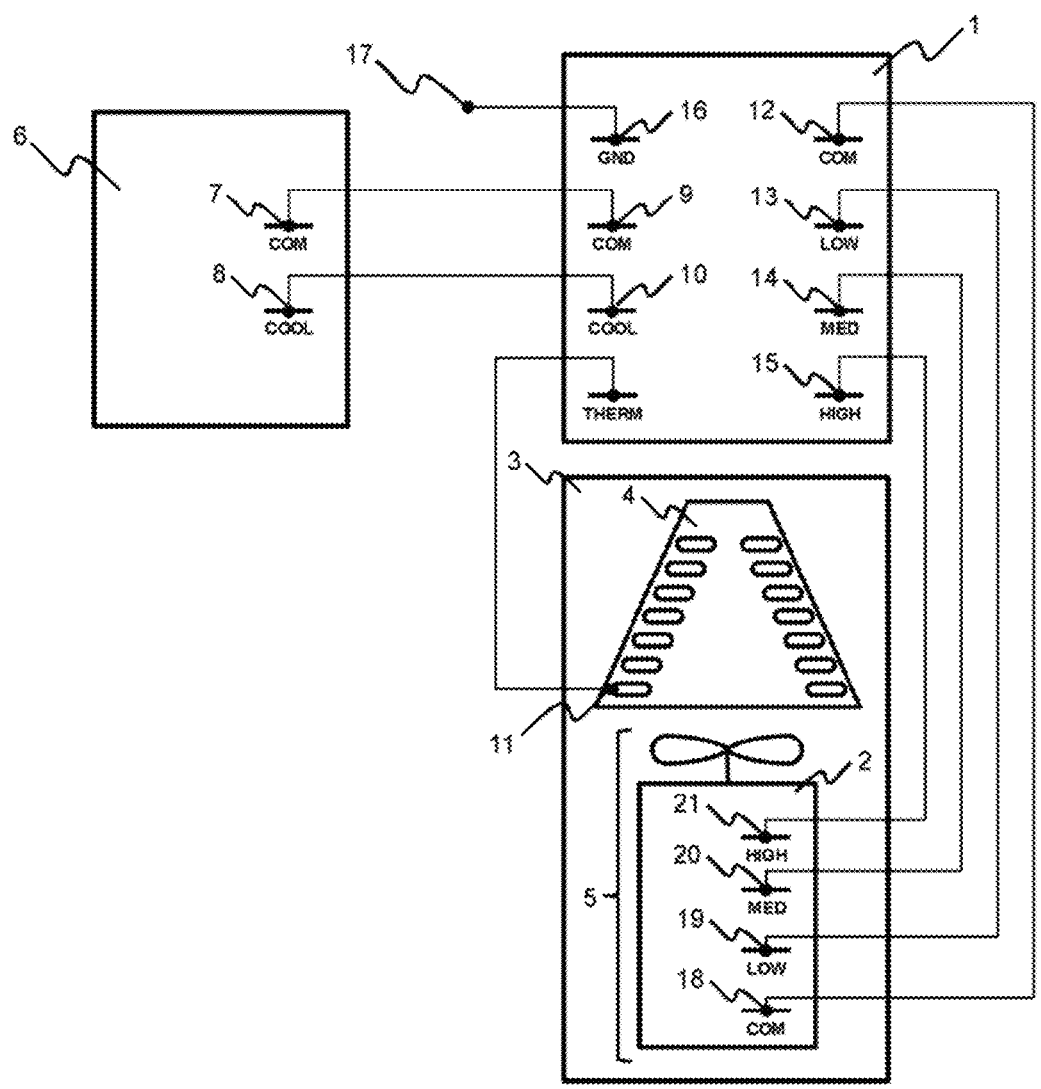
FIG. 5 is a schematic diagram of the currently preferred embodiment of the control board of the present invention installed in the indoor blower motor power circuit of a heat pump or air conditioning system, with the thermistor attached to the saturated region of the indoor coil.

FIG. 5 schematically shows one contemplated implementation of the preferred embodiment of the proposed control board or device (1) when retrofitted on a heat pump or air conditioning system. The hot (8) and common (7) power leads from the system's supplied control board (6) that would normally be connected to one of the power taps of the indoor coil's blower (2) are instead connected to the COOL (10) and COMMON (9) input terminals of the retrofitted control board of the present invention (1). The High (15), Medium (14) and Low (13) Speed output power leads and the common terminal (12) are wired to the High (21), Medium (20), Low Speed (19) and common (18) power taps of the indoor blower motor (2). The thermistor (11) is attached to the saturated section of the indoor coil (4) of the indoor air handler (3). One of ordinary skill will contemplate other implementations given the foregoing disclosure of the control logic and basic approach of the present invention.

Figure 6:
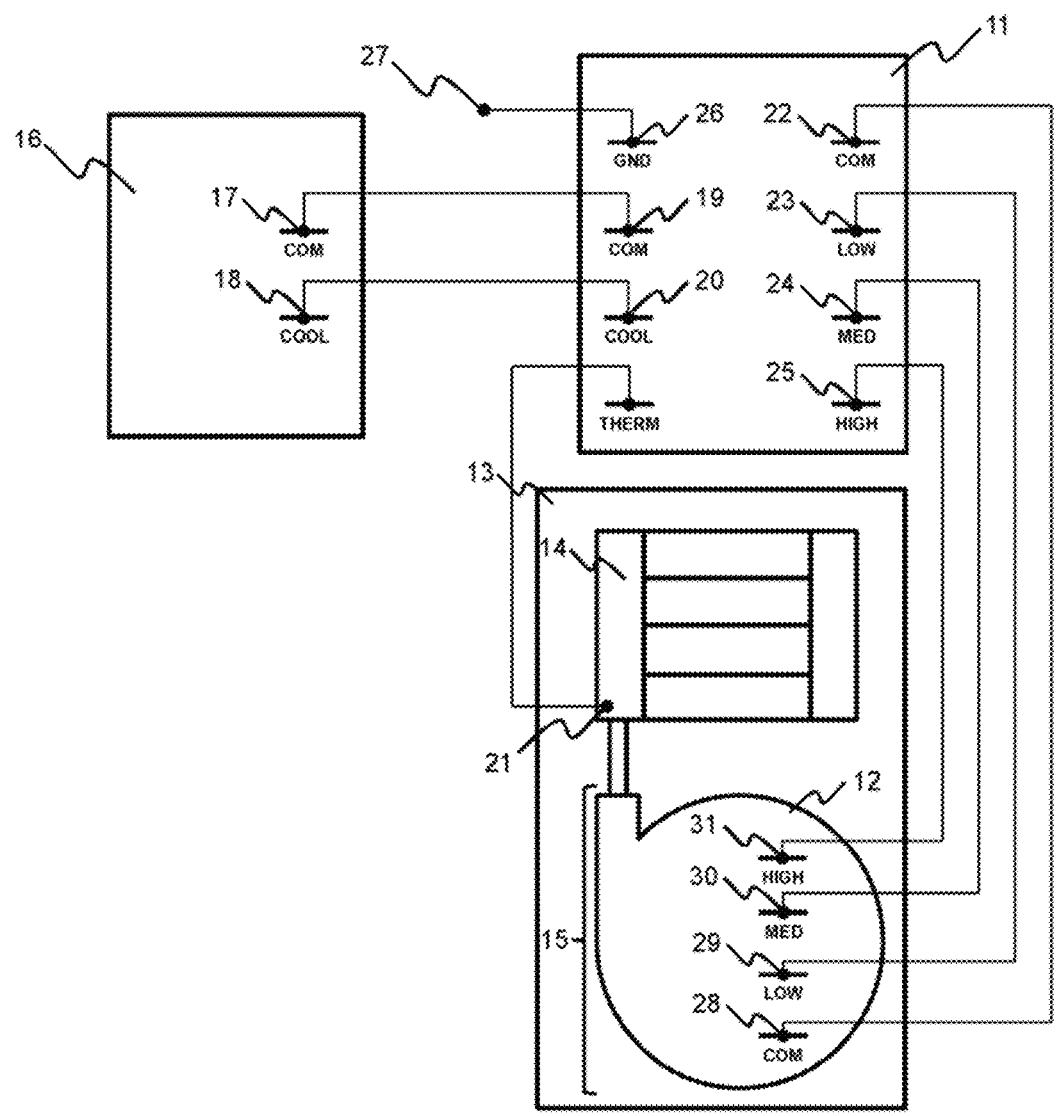
FIG. 6 is a schematic diagram of another contemplated embodiment of the control board of the present invention installed in the liquid pump circuit of a refrigerant to liquid evaporator of a vapor compression system, with the thermistor attached to the saturated refrigerant region of the refrigerant to liquid heat exchanger.

FIG. 6 schematically shows another contemplated implementation of the preferred embodiment of the control board or device (11) when retrofitted on a heat pump or air conditioning system where the evaporator provides cooling to a liquid flow rather than an air flow as was described in FIG. 5. Such a heat pump or air conditioner is commonly referred to as a chiller system (13), since the air conditioning system provides chilled water rather than chilled air. The installation of FIG. 6 is very similar to that of FIG. 5, where the speed of the fluid transport device is varied. However, in FIG. 6 the fluid transport device is a liquid pump (15) rather than a vapor blower or fan as is the case in FIG. 5. As shown in FIG. 6, the hot (18) and common (17) power leads from the system's control board (16) that would normally be connected to one of several speed selecting power taps of the liquid pump motor (12) are instead connected to the COOL (20) and COMMON (19) input terminals of the control board (11). The High (25), Medium (24) and Low (23) Speed output power leads and the common terminal (22) are wired to the High (31), Medium (30), Low Speed (29) and common (28) power taps of the motor (12). The thermistor (21) is attached to the saturated refrigerant section of the refrigerant to liquid evaporative heat exchanger (14).

While we have shown and described several embodiments in accordance with the present invention, it should be clearly understand that the same is susceptible to even further modifications without departing from the scope of the appended claims. Therefore, we do not intend to be limited to the details shown and described herein but intend to cover all changes and modifications that fall within the scope of the appended claims.

We claim:

1. A method for reducing net electrical power consumption of a vapor compression system having a compressor, a condenser and associated condenser fan, and an evaporator motor-driven evaporator blower, comprising operating the compressor and the condenser and the associated condenser fan with the evaporator blower motor initially set to a high speed, recording a baseline evaporator operating temperature with the evaporator blower motor operating at the high speed during the operation of the compressor and condenser, then temporarily operating the evaporator blower motor at a reduced speed while the compressor and the condenser are still operating, detecting if a predetermined acceptable decrease in evaporator temperature from the baseline evaporator operating temperature has not been exceeded, and thereupon keeping the evaporator blower motor at the reduced speed from the initially set high speed as long as the predetermined acceptable decrease has not been exceeded and, if exceeded, returning the evaporator blower motor to the initially set high speed.

2. The method according to claim 1, wherein the magnitude of the predetermined acceptable decease in evaporator temperature is a decrease of up to 10 degrees Fahrenheit.

3. The method according to claim 1, wherein the predetermined acceptable decrease in evaporator temperature is determined by a decrease in the surface temperature of the evaporator.

4. The method according to claim 1, wherein the predetermined acceptable decrease in evaporator temperature is represented by a detected change in one of the evaporator's saturation temperature and the evaporator's saturation pressure.

5. The method of claim 1, wherein a time period for the temporary operation of the evaporator blower motor is between about 30 seconds to 10 minutes.

6. The method according to claim 1, further comprising rechecking a setting of the evaporator blower motor speed each time the system cycles on or at a predetermined frequency between greater than 6 minutes and less than 24 hours.

7. A method for reducing net electrical power consumption of a vapor compression air conditioning or heat pump system having a compressor, an outdoor coil with an associated fan, an indoor coil, and an indoor blower with an associated blower motor, comprising operating the compressor, the outdoor coil fan, and the indoor blower with the indoor blower motor initially set to a high speed, recording a baseline indoor coil operating temperature with the indoor blower motor operating at the high speed during operation of the compressor, outdoor coil fan and indoor blower, then temporarily operating the indoor blower motor at a reduced speed while the compressor and the condenser fan are still operating,
    detecting if a predetermined acceptable change in the indoor coil temperature from the baseline temperature has not been exceeded, and thereupon keeping the indoor blower motor speed at the reduced speed from the initially set high speed as long as the predetermined acceptable change has not been exceeded and, if exceeded, returning the indoor blower motor to the initially set high speed.

8. The method according to claim 7, wherein the magnitude of the predetermined acceptable change in indoor coil temperature is up to 10 degrees Fahrenheit.

9. The method according to claim 7, wherein the predetermined acceptable change in indoor coil temperature is determined by a change of the indoor coil's surface temperature.

10. The method according to claim 7, wherein the predetermined acceptable change in the indoor coil temperature is represented by a change in one of saturation temperature and saturation pressure of refrigerant in the indoor coil.

11. The method according to claim 7, wherein a time period for the temporary operation of the indoor blower motor is between about 30 seconds to 10 minutes.

12. The method according to claim 7, further comprising rechecking a setting of the indoor blower motor speed each time the system cycles on or at a predetermined frequency between greater than 6 minutes and less than 24 hours.

13. A vapor-compression system having a compressor, a condenser and associated fan and an evaporator and associated blower motor, comprising a control board for reducing the system's net electrical power consumption being operatively associated with the blower motor and configured such that, when operating the compressor, the condenser fan and the evaporator with the evaporator blower initially set to a high speed, a baseline evaporator operating temperature is recorded and thereafter temporarily operates the evaporator blower at a reduced speed with the compressor and the condenser fan still operating and detecting if a predetermined acceptable decrease in evaporator temperature from the baseline evaporator operating temperature has not been exceeded, wherein the control board is further configured to keep the evaporator blower at the reduced speed from the initially set high speed as long as the predetermined acceptable decrease has not been exceeded and, if exceeded, returning the evaporator blower motor to the initially set high speed.

14. The system according to claim 13, wherein the circuitry is configured such that a time period for the temporary operation of the evaporator blower is between about 30 seconds to 10 minutes.

15. The system according to claim 13, wherein the predetermined acceptable decrease in evaporator temperature is a temperature decrease of up to 10 degrees Fahrenheit.

16. The system according to claim 13, wherein the control board is further configured to recheck a setting of the evaporator blower motor speed each time the system cycles on or at a predetermined frequency between greater than 6 minutes and less than 24 hours.

17. A control board configured to carry out the method according to claim 13, wherein the control board is inserted into the blower motor power circuit and is powered by electrical energy supplied to the blower motor and is unpowered when the electrical energy is not being supplied to the blower motor.

18. A vapor compression system having a compressor and an indoor coil with an associated indoor blower and blower motor, comprising a control board for reducing the system's net electrical power consumption being operatively associated with the blower motor and having circuitry configured such that, when operating the compressor and the indoor blower with the indoor blower motor initially set to a high speed, a baseline indoor coil operating temperature is recorded and then temporarily operates the indoor blower motor at a reduced speed while the compressor and the condenser are still operating, wherein the control board is further configured to detect if a predetermined acceptable change in the indoor coil temperature from the baseline temperature has not been exceeded, thereupon keep the indoor blower motor speed at the reduced seed from the initially set high speed as long as the predetermined acceptable change has not been exceeded and, if exceeded, returning the indoor blower motor to the initially set high speed.

19. The system according to claim 18, wherein the circuitry is configured such that a time period for the temporary operation of the indoor blower motor is between about 30 seconds to 10 minutes.

20. The system according to claim 18, wherein the magnitude of the predetermined change in coil temperature is up to 10 degrees Fahrenheit.

21. The system according to claim 18, wherein the control board is further configured to recheck a setting of the indoor blower motor speed each time the system cycles on or at a predetermined frequency between greater than 6 minutes and less than 24 hours.

22. A control board configured to carry out the method according to claim 18, wherein the control board is inserted into the blower motor power circuit and is powered by electrical energy being supplied to the blower motor and is unpowered when the electrical energy is not being supplied to the blower motor.

23. A vapor compression system having a compressor, an evaporator and a fluid transporter for providing energy to the evaporator, comprising a control board configured to be retrofittable into the vapor compression system for reducing the system's net power consumption and being operatively associated with a motor of the fluid transporter for controlling speed of the fluid transporter, the control board having circuitry configured such that, when operating the compressor and the evaporator with the fluid transporter initially set to a high speed, a baseline evaporator operating temperature is recorded and then the fluid transporter motor is operated at a reduced speed with the compressor still operating, wherein acceptable decrease in evaporator temperature from the baseline evaporator operating temperature has not been exceeded, thereupon keep the fluid transporter at the reduced speed from the initially set high speed as long as the predetermined acceptable decrease has not been exceeded and, if exceeded, returning the fluid transporter motor to the initially set high speed.

24. The system according to claim 23, wherein the fluid transporter is a pump operative to supply a liquid fluid to be cooled by the evaporator.

25. The system according to claim 23, wherein the fluid transporter is a blower.

26. The system according to claim 23, wherein the control board is configured such that a time period for the temporary operation of the fluid transporter is between about 30 seconds to 10 minutes.

27. The system according to claim 23, wherein the predetermined acceptable decrease in evaporator temperature is a decrease of up to 10 degrees Fahrenheit.

28. The system according to claim 23, wherein the control board is further configured to recheck a setting of the fluid transporter motor speed each time the system cycles on or at a predetermined frequency between greater than 6 minutes and less than 24 hours.

29. A control board configured to carry out the method according to claim 23, wherein the control board is inserted into the blower motor power circuit and is powered by electrical energy being supplied to the blower motor and is unpowered when the electrical energy is not being supplied to the blower motor.

30. A method for reducing net electrical power consumption of a vapor compression system having a compressor, a condenser and associated condenser fan, and an evaporator associated with a blower and blower motor capable of running at high, medium and low speeds, comprising
(a) operating the compressor and the condenser fan with the evaporator blower motor initially set to the high speed,
(b) determining the evaporator operating temperature with the evaporator blower motor operating at the high speed during the operation of the compressor and the condenser fan,
(c) operating the evaporator blower motor at the medium speed during operation of the compressor and the condenser fan and determining if a decrease in evaporator temperature occurs when operating at the medium speed,
(d) if, during operation of the compressor and condenser fan, an acceptable decrease in an evaporator temperature has been exceeded at the medium speed, operating the evaporator blower motor at the high speed,
(e) if, during operation of the compressor and condenser fan, the acceptable decrease in an evaporator temperature has not been exceeded at the medium speed, operating the evaporator blower motor at the low speed, and determining if any decrease in evaporator temperature occurs when operating at the low speed, and
(f) if, during the continued operation of the compressor and condenser fan, the acceptable decrease in an evaporator temperature when operating at the low speed has been exceeded, returning the evaporator blower motor to the medium speed.

31. The method according to claim 30, wherein the acceptable decrease in evaporator temperature is a decrease of up to 10 degrees Fahrenheit.

32. The method according to claim 30, wherein the acceptable decrease in evaporator temperature is a decrease in the surface temperature of the evaporator.

33. The method according to claim 30, wherein the acceptable decrease in evaporator temperature is represented by a detected change in one of the evaporator's saturation temperature and the evaporator's saturation pressure.

34. The method of claim 30, wherein a time period for the operation of the evaporator blower motor between the speeds is between about 30 seconds to 10 minutes.

35. The method according to claim 30, wherein, with the evaporator blower motor being configured to operate at more than three speeds, steps (a)-(e) are repeated for each of the motor speeds from highest to lowest so that the motor runs at its lowest speed as long as the acceptable decrease has not been exceeded but is returned to a higher speed if the acceptable decrease has been exceeded.

36. The method according to claim 30, further comprising rechecking a setting of the evaporator blower motor speed each time the system cycles on or at a predetermined frequency between greater than 6 minutes and less than 24 hours.

37. A method for reducing net electrical power consumption of a vapor compression air conditioning or heat pump system having a compressor, an outdoor heat exchanger coil and associated outdoor coil fan, and an indoor heat exchanger coil associated with an indoor coil blower and indoor blower motor capable of running at high, medium and low speeds, comprising
(a) operating the compressor and the outdoor coil fan with the indoor coil blower motor initially set to the high speed,
(b) determining the indoor coil operating temperature with the indoor coil blower motor operating at the high speed during the operation of the compressor and outdoor coil fan,
(c) operating the indoor coil blower motor at the medium speed during operation of the compressor and the outdoor coil fan, and determining if an acceptable change in the indoor coil operating temperature occurs when operating at the medium speed,
(d) if, during operation of the compressor and outdoor coil fan, the acceptable change in an indoor coil temperature has been exceeded, operating the indoor coil blower motor at the high speed, (e) if, during operation of the compressor and outdoor coil fan, the acceptable change in the indoor coil temperature has not been exceeded, operating the indoor coil blower motor at the low speed, during operation of the compressor and the outdoor fan and determining if an acceptable change in the indoor coil temperature occurs when operating at the low speed, and (f) if, during the continued operation of the compressor and outdoor coil fan, the acceptable change in the indoor coil temperature has been exceeded when running at the low speed, returning the indoor coil blower motor to the medium speed.

38. The method according to claim 37, wherein the acceptable change in indoor coil temperature between each of the speeds is up to 10 degrees Fahrenheit.

39. The method according to claim 37, wherein the acceptable change in indoor coil temperature is the change in the surface temperature of the indoor coil.

40. The method according to claim 37, wherein the acceptable change in the indoor coil temperature is represented by a detected change in one of the indoor coil's saturation temperature and the indoor coil's saturation pressure.

41. The method of claim 37, further comprising rechecking a setting of the indoor blower motor speed each time the system cycles on or at a predetermined frequency between greater than 6 minutes and less than 24 hours.

42. The method according to claim 37, wherein, with the indoor coil blower motor being configured to operate at more than three speeds, steps (a)-(e) are repeated for each of the motor speeds from highest to lowest so that the motor runs at its lowest speed as long as the acceptable change has not been exceeded but is returned to a higher speed if the acceptable decrease has been exceeded.

43. A method for reducing net power consumption of a vapor compression system having a compressor, a condenser with an associated condenser fan, and an evaporator with an associated evaporator blower driven by a motor configured to produce two or more air flows, comprising during operation of the compressor and condenser fan, running the evaporator blower motor at the lowest air flow where an acceptable change in evaporator temperature has not been exceeded and, if exceeded, returning the evaporator blower motor to an initially set high speed.

44. A method for reducing net power consumption of a vapor compression system having a compressor, an outdoor coil with an associated fan, an indoor coil and an indoor blower with an associated blower motor configured to produce two or more air flows, comprising during operation of the compressor and outdoor coil fan, running the indoor blower motor at the lowest air flow where an acceptable change in evaporator temperature has not been exceeded and, if exceeded, returning the indoor blower motor to an initially set high speed.

45. A retrofitable control board for reducing net power consumption of a vapor compression system having a compressor, a condenser with an associated condenser fan, and an evaporator with an associated evaporator blower driven by a motor configured to produce two or more air flows, comprising control circuitry configured to run the evaporator blower motor at the lowest air flow during operation of the compressor and condenser fan where an acceptable change in evaporator temperature has not been exceeded and, if exceeded, returning the evaporator blower motor to an initially set high speed.

46. A retrofitable control board for reducing net power consumption of a vapor compression system having a compressor, an outdoor coil with an associated fan, an indoor coil and an indoor coil blower with an associated blower motor configured to produce two or more air flows comprising control circuitry configured to run the indoor coil blower motor at the lowest air flow during operation of the compressor and outdoor coil fan where an acceptable change in evaporator temperature has not been exceeded and, if exceeded, returning the indoor blower motor to an initially set high speed.

* * * * *